United States Patent
Laver et al.

(10) Patent No.: US 9,755,831 B2
(45) Date of Patent: Sep. 5, 2017

(54) KEY EXTRACTION DURING SECURE BOOT

(71) Applicant: QUALCOMM Incorporated, San Diego, CA (US)

(72) Inventors: Steven Douglas Laver, San Diego, CA (US); Xu Guo, San Diego, CA (US); Brian Marc Rosenberg, San Diego, CA (US); David Merrill Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/161,185

(22) Filed: Jan. 22, 2014

(65) Prior Publication Data

US 2015/0207624 A1    Jul. 23, 2015

(51) Int. Cl.
*H04L 9/08* (2006.01)
*G06F 21/57* (2013.01)

(52) U.S. Cl.
CPC .......... *H04L 9/0894* (2013.01); *G06F 21/575* (2013.01); *H04L 9/0866* (2013.01)

(58) Field of Classification Search
CPC .................. G06F 21/57; G06F 21/575; H04L 9/0861–9/0877
See application file for complete search history.

(56) References Cited

U.S. PATENT DOCUMENTS

| 5,363,447 A * | 11/1994 | Rager | H04L 9/0894 380/273 |
|---|---|---|---|
| 6,675,303 B1 * | 1/2004 | Lam | G06F 1/24 713/1 |
| 2012/0210115 A1 | 8/2012 | Park et al. | |

(Continued)

FOREIGN PATENT DOCUMENTS

WO    WO-2012045627 A1    4/2012

OTHER PUBLICATIONS

Areno M et al., "Securing Trusted Execution Environments with PUF Generated Secret Keys", Trust, Security and Privacy in Computing and Communications (TRUSTCOM), 2012 IEEE 11th International Conference on, IEEE, Jun. 25, 2012 (Jun. 25, 2012), pp. 1188-1193, XP032233551, DOI: 10.1109/TRUSTCOM.2012.255, ISBN: 978-1-4673-2172-3.

(Continued)

*Primary Examiner* — Harunur Rashid
*Assistant Examiner* — Wayne An
(74) *Attorney, Agent, or Firm* — Loza & Loza, LLP

(57) ABSTRACT

One feature pertains to a method for extracting a secret key during a secure boot flow of an integrated circuit. Specifically, the secure boot flow includes powering ON a first volatile memory circuit to generate a plurality of initial logical state values, deriving secret data based on the plurality of initial logical state values, storing the secret data in a secure volatile memory circuit that is secured by a secure execution environment (SEE), clearing the plurality of initial logical state values in the first volatile memory circuit, executing a cryptographic algorithm at the SEE to extract a secret key based on the secret data, and storing the secret key in the secure volatile memory circuit. The secure boot flow controls access to the first volatile memory circuit to secure the secret data and the plurality of initial logical state values from the insecure applications.

24 Claims, 9 Drawing Sheets

(56) References Cited

U.S. PATENT DOCUMENTS

2012/0290870 A1 11/2012 Shah et al.
2013/0051552 A1 2/2013 Handschuh et al.

OTHER PUBLICATIONS

International Search Report and Written Opinion—PCT/US2015/011991—ISA/EPO—dated Apr. 30, 2015.
Bohm C., et al., "A microcontroller SRAM-PUF," 2011 5th International Conference on Network and System Security (NSS), Sep. 2011, pp. 269-273.
Handschuh, H., "Hardware-Anchored Security Based on SRAM PUFs, Part 1," IEEE Security and Privacy, vol. 10, No. 3, 2012, pp. 80-83.
Handschuh H., "Hardware-Anchored Security Based on SRAM PUFs, Part 2," IEEE Security & Privacy, Copublished by the IEEE Computer and Reliability Societies, vol. 10 (4), Gutmann P., Ed., Jul./Aug. 2012, pp. 80-81.
Schaller A., et al., "Bootloader Protection Using Inherent PUFs," Security Engineering, Cased, Mar. 11, 2013, Slide 1 to Slide 19.

\* cited by examiner

KEY EXTRACTION DURING SECURE BOOT

BACKGROUND

Field

Various features generally relate to secure cryptographic key extraction and storage, and more particularly to extracting and storing a secret cryptographic key during a secure boot process based on physically unclonable features of volatile memory.

Background

Many electronic communication devices, such as mobile phones, tablets, and computers include a device-specific cryptographic key (or keys derived from such a key) that can be used for cryptographic security processes at the electronic communication device. For example, a device-specific key known only to the device and possibly to another trusted entity (e.g., a cellular network authentication server providing communication service to the device) is used to derive keys (e.g., a public-private key pair) that are subsequently used to encrypt communication messages transmitted by the device. Securing the device-specific key from unauthorized access by other parties and/or applications is of utmost importance in order to better guarantee the integrity of cryptographic security protocols employed by the device and/or the communication network.

FIG. 1 illustrates a schematic block diagram of a prior art integrated circuit (IC) 100 that may be found in an electronic communication device. The IC 100 includes a boot loader 102, user applications 104, and a non-volatile memory circuit 106, which in turn stores a cryptographic key 108 that may be unique to the device having the IC 100. When the IC 100 is powered ON, the IC 100 retrieves and executes the boot loader that initializes various aspects of the IC 100. After the IC 100 completes its boot up process, user applications 104 (e.g., high level operating systems (HLOS), applications running on such HLOS, etc.) may be executed. The boot loader 102 and the user applications 104 may have direct access to the key 108. For example, a user application may retrieve the key 108 from the non-volatile memory 106 and use it to derive additional keys used for cryptographic processes.

Moreover, since the memory circuit 106 storing the key 108 is non-volatile memory, the key 108 is stored in the IC 100 (and therefore theoretically accessible) regardless of whether the IC 100 is powered OFF or ON. This exposes the key 108 to greater security vulnerability. For example, the top of the integrated circuit 100 package may be physically opened and an electron microscope can be used to analyze the circuitry (e.g., fuses) used for storing the key 108. Doing so may reveal the key 108 and compromise the security of the device.

There exists a need for methods and apparatuses that provide increased security in key extraction/generation and storage to help prevent unauthorized access to such keys. Improved security in key extraction/generation and storage helps increase confidence and reliability in the cryptographic algorithms and processes that rely on such keys.

SUMMARY

One feature provides a method operational at an integrated circuit, the method comprising powering ON a first volatile memory circuit to generate a plurality of initial logical state values, the first volatile memory circuit on the integrated circuit, deriving secret data based on the plurality of initial logical state values, storing the secret data in a secure volatile memory circuit, the secure volatile memory circuit secured by a secure execution environment (SEE), clearing the plurality of initial logical state values in the first volatile memory circuit, executing a cryptographic algorithm at the SEE to extract a secret key based on the secret data, and storing the secret key in the secure volatile memory circuit. According to one aspect, the method is a secure boot flow of the integrated circuit that controls access to the first volatile memory circuit to secure the secret data and the plurality of initial logical state values from one or more insecure applications. According to another aspect, the secure boot flow secures the secret data and the plurality of initial logical state values from the one or more insecure applications by rendering the first volatile memory circuit inaccessible to the one or more insecure applications until at least after the plurality of initial logical state values have been cleared in the first volatile memory circuit.

According to one aspect, the secure boot flow includes a primary boot loader, a first secondary boot loader, and a second secondary boot loader, and the secure boot flow establishes a chain of trust by having the primary boot loader authenticate the first secondary boot loader before the first secondary boot loader executes, the first secondary boot loader authenticate the second secondary boot loader before the second secondary boot loader executes, and the second secondary boot loader authenticate the SEE, and wherein the secret key is extracted and stored in the secure volatile memory circuit during the secure boot flow and prior to execution of the one or more insecure applications. According to another aspect, resetting the first volatile memory circuit causes the secure boot flow to be executed. According to yet another aspect, the secret data is the plurality of initial logical state values.

According to one aspect, after clearing the first volatile memory circuit the first volatile memory circuit is available for data storage for one or more insecure applications. According to another aspect, the first volatile memory circuit is static random access memory (SRAM). According to yet another aspect, the SEE prevents insecure applications from accessing the secure volatile memory circuit.

According to one aspect, the plurality of initial logical state values are substantially the same every time the first volatile memory circuit is powered ON. According to another aspect, the cryptographic algorithm is based on at least one of a block code algorithm, a spreading code algorithm, and/or a repeat code algorithm. According to yet another aspect, the method further comprises storing the secret data in a second volatile memory circuit prior to storing the secret data in the secure volatile memory circuit, and clearing the secret data stored in the second volatile memory circuit after storing the secret data in the secure volatile memory circuit.

According to one aspect, after clearing the secret data stored in the second volatile memory circuit, the second volatile memory circuit is available for data storage for one or more insecure applications. According to another aspect, the SEE controls access to the secret key by making it inaccessible to an insecure application, and the method further comprises receiving a request from the insecure application at the SEE for at least one of a secondary key and/or public data, generating the secondary key and/or the public data at the SEE based on the secret key, and providing the secondary key and/or the public data to the insecure application requesting the secondary key and/or the public data. According to yet another aspect, the secondary key and/or the public data is generated based on the secret key and other data provided by the insecure application. According to another aspect, the cryptographic algorithm executed at the SEE to extract the secret key based on the secret data is further based on auxiliary data stored in a non-volatile memory circuit.

Another feature provides an integrated circuit comprising a first volatile memory circuit configured to generate a plurality of initial logical state values upon power ON, a secure volatile memory circuit secured by a secure execution environment (SEE), and a processing circuit communicatively coupled to the first volatile memory circuit and the secure volatile memory circuit, the processing circuit configured to derive secret data based on the plurality of initial logical state values, store the secret data in the secure volatile memory circuit, clear the plurality of initial logical state values in the first volatile memory circuit, execute a cryptographic algorithm at the SEE to extract a secret key based on the secret data, and store the secret key in the secure volatile memory circuit. According to one aspect, the processing circuit executes a secure boot flow by (i) deriving the secret data, (ii) storing the secret data, (iii) clearing the plurality of initial logical state values, (iv) executing the cryptographic algorithm, and (v) storing the secret key, and wherein the secure boot flow controls access to the first volatile memory circuit to secure the secret data and the plurality of initial logical state values from one or more insecure applications.

According to one aspect, the processing circuit is further configured to store the secret data in a second volatile memory circuit prior to storing the secret data in the secure volatile memory circuit, and clear the secret data stored in the second volatile memory circuit after storing the secret data in the secure volatile memory circuit. According to another aspect, the SEE controls access to the secret key by making it inaccessible to an insecure application, and wherein the processing circuit is further configured to receive a request from the insecure application at the SEE for at least one of a secondary key and/or public data, generate the secondary key and/or the public data at the SEE based on the secret key, and provide the secondary key and/or the public data to the insecure application requesting the secondary key and/or the public data.

Another feature provides an integrated circuit comprising means for powering ON a first volatile memory circuit to generate a plurality of initial logical state values, the first volatile memory circuit on the integrated circuit, means for deriving secret data based on the plurality of initial logical state values, means for storing the secret data in a secure volatile memory circuit, the secure volatile memory circuit secured by a secure execution environment (SEE), means for clearing the plurality of initial logical state values in the first volatile memory circuit, means for executing a cryptographic algorithm at the SEE to extract a secret key based on the secret data, and means for storing the secret key in the secure volatile memory circuit.

Another feature provides a computer-readable storage medium having one or more instructions stored thereon, which when executed by at least one integrated circuit, causes the integrated circuit to power ON a first volatile memory circuit to generate a plurality of initial logical state values, the first volatile memory circuit on the integrated circuit, derive secret data based on the plurality of initial logical state values, store the secret data in a secure volatile memory circuit, the secure volatile memory circuit secured by a secure execution environment (SEE), clear the plurality of initial logical state values in the first volatile memory circuit, execute a cryptographic algorithm at the SEE to extract a secret key based on the secret data, and store the secret key in the secure volatile memory circuit. According to one aspect, the one or more instructions is for a secure boot flow of the integrated circuit, which when executed by the integrated circuit causes access to the first volatile memory circuit to be controlled to secure the secret data and the plurality of initial logical state values from one or more insecure applications by rendering the first volatile memory circuit inaccessible to the one or more insecure applications until at least after the plurality of initial logical state values have been cleared in the first volatile memory circuit.

BRIEF DESCRIPTION OF THE DRAWINGS

FIG. 7, comprising

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Overview

Methods and apparatuses are described herein that extract a secret key during a secure boot flow of an integrated circuit. Specifically, the secure boot flow includes powering ON a first volatile memory circuit to generate a plurality of initial logical state values, deriving secret data based on the plurality of initial logical state values, storing the secret data in a secure volatile memory circuit that is secured by a secure execution environment (SEE), clearing the plurality of initial logical state values in the first volatile memory circuit, executing a cryptographic algorithm at the SEE to extract a secret key based on the secret data, and storing the secret key in the secure volatile memory circuit. The secure boot flow controls access to the first volatile memory circuit to secure the secret data and the plurality of initial logical state values from the insecure applications by rendering the first volatile memory circuit inaccessible to the insecure applications until at least after the plurality of initial logical state values have been cleared in the first volatile memory circuit. Moreover, if the first volatile memory circuit is reset then the secure boot flow is again initiated, and thus the initial logical state values of the first volatile memory circuit is unavailable to insecure applications.

Exemplary Key Extraction During IC Secure Boot Up

Figure 1:
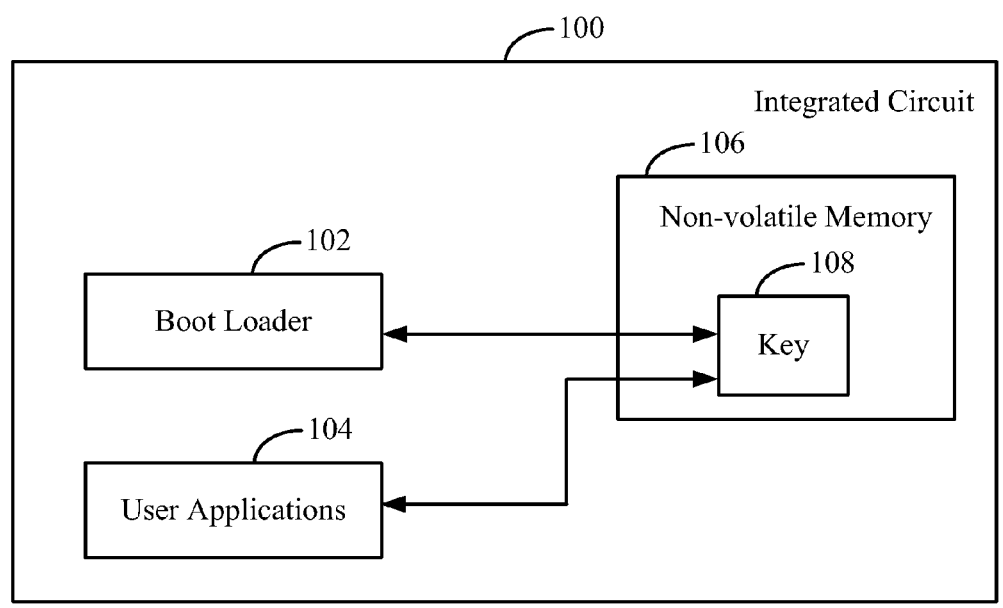
FIG. 1 illustrates a schematic block diagram of a prior art integrated circuit (IC) that may be found in an electronic communication device.
Figure 2:
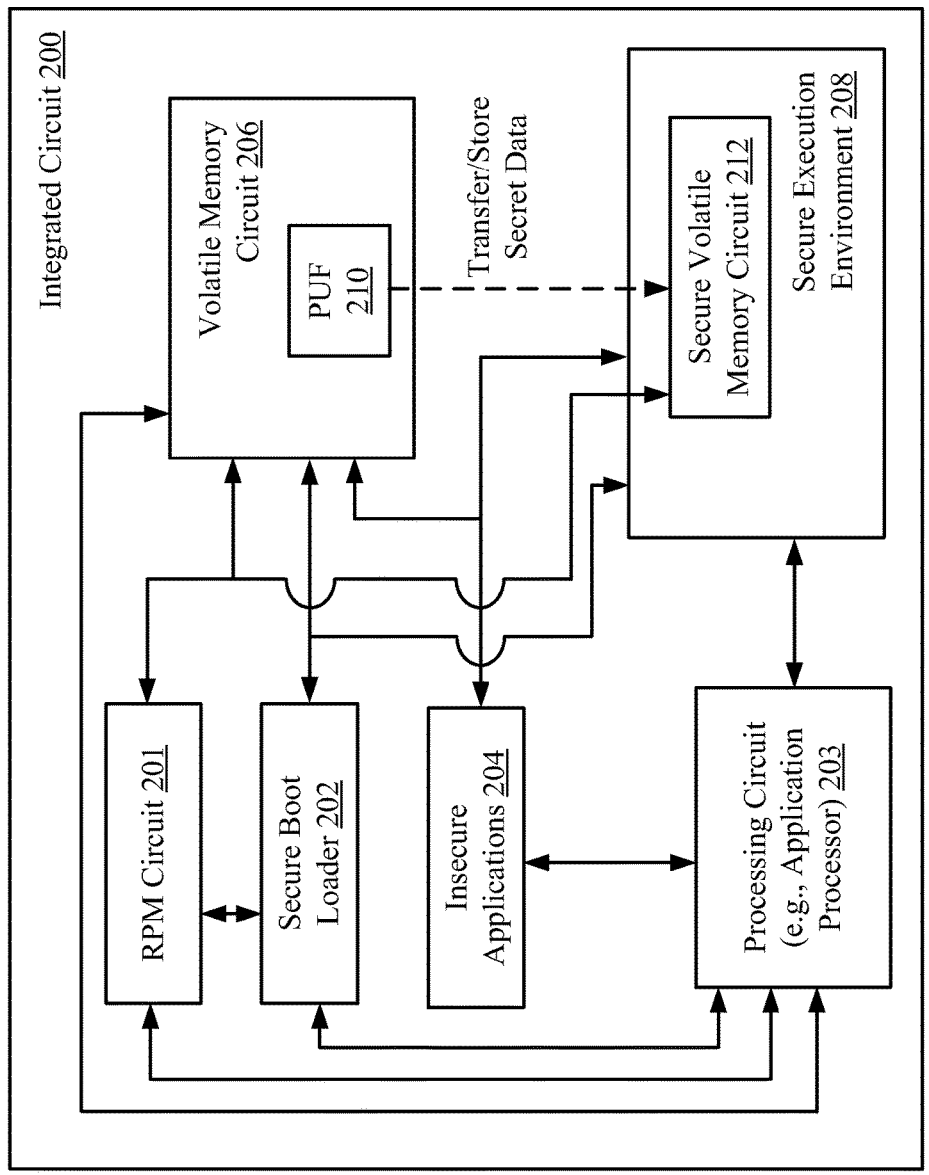
FIG. 2 illustrates a high level schematic block diagram of an IC.

FIG. 2 illustrates a high level schematic block diagram of an integrated circuit (IC) 200 according to one aspect of the disclosure. The IC 200 may be, for example, a processor that includes processing circuits, memory circuits, etc., and may be found in an electronic communication device, such as but not limited to a mobile phone, computer, tablet, watch, etc. The IC 200 may include a resource power management (RPM) circuit 201, a secure boot loader circuit 202, a processing circuit 203, insecure applications 204, a volatile memory circuit 206, and a secure execution environment (SEE) 208. The volatile memory circuit 206 includes a physically unclonable function (PUF) 210, and the SEE 208 includes a secure volatile memory circuit 212.

Among other things, the RPM circuit 201 supplies power to various circuits and components of the IC 200. For example, the RPM circuit 201 may control the power supplied to the processing circuit 203, the volatile memory circuit 206, and/or the secure volatile memory circuit 212. The RPM circuit 201 represents one example of a means for powering ON the first volatile memory circuit to generate a plurality of initial logical state values.

Upon IC 200 power ON, the IC 200 undergoes/executes a secure boot up process (also referred to herein as "secure boot flow") by having the processing circuit 203 obtain and execute the secure boot loader (e.g., secure boot code) 202. The secure boot loader 202 may be stored in memory circuits such as but not limited to read-only memory (ROM) and/or other non-volatile memory. The secure boot loader 202 initializes various modules of the IC 200 and performs other basic operations in order to ready the IC 200 for normal operation.

According to one aspect of the disclosure, the volatile memory circuit 206 includes one or more static random access memory (SRAM) circuits that each include a plurality of SRAM circuit cells. According to other aspects, the volatile memory circuit 206 is not limited to SRAM and may be based on other types of volatile memory, such as embedded dynamic random access memory (eDRAM). A portion of the volatile memory circuit 206 (i.e., a number of volatile memory cells) may form the basis of physically unclonable function (PUF).

An on-chip PUF is a chip-unique challenge-response mechanism exploiting manufacturing process variations of integrated circuits (ICs). When a physical stimulus (i.e., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF's "unclonability" means that each device employing the PUF has a unique and unpredictable way of mapping challenges to responses, even if one device is manufactured with the same process as another seemingly identical device. Thus, it is practically infeasible to construct a PUF with the same challenge-response behavior as another device's PUF because exact control over the manufacturing process is infeasible.

In the present disclosure, the volatile memory circuit 206 is a type of volatile memory (e.g., SRAM), where each circuit cell that comprises the volatile memory circuit 206 naturally initializes to an initial, preferred logical state value (e.g., "0" or "1") at start-up (i.e., when powered ON). For example, SRAM has such a property when powered ON. The initial logical state values of the circuit cells are repeatable in that each volatile memory cell initializes to the same value each time at start-up with a high probability. However, the initial logical state values of the circuit cells are random from one IC to another IC, even if manufactured to be the same. Thus, due to manufacturing process variation, each integrated circuit's volatile memory circuits 206—even if manufactured to be the same—will exhibit different repeatable initial values so that from IC to IC the initial volatile memory circuit startup values are different at the same memory address locations across different ICs. Thus, each IC 200 has a volatile memory circuit 206 (e.g., SRAM circuit) that has a unique, yet repeatable identifier based on the initial power ON states of its volatile memory circuit's cells.

The portion/number of volatile memory cells of the volatile memory circuit 206 used as the basis for the PUF 210 may vary depending on the application. According to one example, an 8 kilobyte portion of the volatile memory circuit 206 may comprise the PUF 210. In practice, however, the amount of memory used for the PUF 210 may be any value, such as but not limited to 512 bytes, 1 kilobyte, 2 kilobytes, 4 kilobytes, 8 kilobytes, 16 kilobytes, etc. The size of the entire volatile memory circuit 206 is typically larger than the portion used for the PUF 210. As just one example, the volatile memory circuit 206 may be 384 kilobytes. However, the volatile memory circuit 206 may be any size, such as but not limited to 64 kilobytes, 128 kilobytes, 256, kilobytes, 384 kilobytes, 512 kilobytes, 768 kilobytes, 1,024 kilobytes, 2,048 kilobytes, etc.

As described above, when the volatile memory circuit 206 is powered ON, its memory circuit cells each settle to an initially preferred logical state value based on minute manufacturing variation among the cells. The portion of memory used as the PUF 210 is no different: its memory cells too will initially settle to preferred initial logical state values. In this sense, the PUF challenge may be considered powering ON the PUF's 210 volatile memory circuit cells and the response is the initial logical state values of its memory circuit cells.

Once the PUF's 210 memory circuit cells have settled to their initial logical state values, the secure boot loader 202 may derive secret data based on the initial logical state values. According to one aspect, the secret data may be equal to the initial logical state values. According to another aspect, the secret data may be derived based on some function of the initial logical state values. Some non-limiting examples of the function that the secret data is based on include but are not limited to: the secret data equal to every other (or some other multiple) bit of the initial logical state values, the secret data equal to a value based on one or more mathematical operations (addition, subtraction, concatenation, etc.) performed on the initial logical state values, etc. The secure boot loader 202 then stores the secret data in the secure volatile memory circuit 212 controlled by the SEE 208. Next, the secure boot loader 202 clears/deletes the PUF's 210 memory circuit cells of their initial logical state values. It may accomplish this by writing a logical state "0" or "1" to all the PUF's 210 memory circuit cells or by randomly changing their logical state values (random "0" or "1"). In a similar fashion, the secure boot loader 202 also clears/deletes any of the secret data that may have been temporarily stored elsewhere outside of the secure volatile memory circuit 212. Once cleared, the memory circuit cells that originally stored the initial logical state values are free to be used for general data storage as needed. For example, once the high level operating system (HLOS) and user applications are loaded and executed they may use these cleared memory circuit cells.

Thus, the secure boot loader 202 represents one example of a means for deriving secret data based on the plurality of initial logical state values. The secure boot loader 202 also represents one example of a means for storing the secret data in the secure volatile memory circuit 212. Moreover, the secure boot loader 202 represents one example of a means for clearing the plurality of initial logical state values in the first volatile memory circuit 206.

The SEE 208 is a secure mode of operation of the IC 200. For example, the SEE 208 may comprise and have access to specific hardware modules and circuits, such as control logic, buses, and memory circuits that are unavailable to other applications running in an insecure operational mode of the IC 200. The SEE 208 may have complete control and access over its secure volatile memory circuit 212 such that other applications (e.g., user applications, HLOS, and even some or all types of boot loaders) cannot access (e.g., read and/or write) to the secure volatile memory circuit 212.

The SEE 208 (e.g., using its own control logic) may then extract a secret key (e.g., generate the secret key) based on the secret data that is stored in its secure volatile memory circuit 212. The SEE 208 uses a cryptographic security algorithm to accomplish this. The algorithm used is not limited to any one specific type of algorithm or family of algorithms. Some non-limiting examples include block code algorithms, spreading code algorithms, and/or repeat code algorithms. In one example, in addition to the secret data, auxiliary data may be used by the algorithm to extract the secret key. The auxiliary data may be stored in insecure memory that is accessible by insecure applications. That is, there is no requirement that the auxiliary data be securely stored since its exposure by itself does not jeopardize the security of the secret key and/or initial logical state values of the first volatile memory circuit 206.

Since the volatile memory (e.g., SRAM) based PUF 210 provides substantially the same initial logical state values upon power ON, the SEE's cryptographic algorithm is able to extract the same secret key every time. The cryptographic algorithm may use error correction techniques to extract the same secret key even if some of the initial logical state values are different between different power ON cycles. The secret key extracted is unique to the specific IC 200 since the initial logical state values of the PUF 210 are different across different ICs 200 even if manufactured to be the same.

The SEE 208 stores the secret key extracted in secure volatile memory, such as the secure volatile memory circuit 212 shown in FIG. 2, and thus insecure applications (e.g., HLOS, user applications, and/or some secondary boot loaders, etc.) 204 cannot access the secret key stored and secured by the SEE 208. Instead, insecure applications 204 may make a request to the SEE 208 to be provided cryptographic data and/or public data (e.g., data that may be publicly revealed) based on the secret key. For example, the SEE 208 may generate cryptographic data such as but not limited to one or more secondary keys or key-pairs based on the secret key and provide those secondary keys to the insecure applications 204. The SEE may also generate public data such as but not limited to a device serial number based on the secret key and provide that public data to the insecure applications 204. Both cryptographic data and public data may herein be referred to as "SEE output data."

Moreover, since the secret key is only stored in secure volatile memory 212, the secret key is lost when the IC 200 is powered OFF. It must again be re-extracted upon power ON based on the PUF's 210 initial logical state values as described above. A nefarious party attempting to gain unauthorized access to the secret key by physically opening up the IC 200 and inspecting memory circuits would be unable to obtain the key since it is not stored in non-volatile memory.

According to one aspect, the IC 200 and/or the volatile memory circuit 206 is designed such that upon reset (i.e., powered OFF and powered ON and/or returned to its initial state) the secure boot flow is immediately executed (e.g., the IC 200 is also reset). According to one aspect, the RPM circuit 201 may be in sole control of resetting the volatile memory circuit 206. As such an insecure application 204 cannot reset the PUF 210 and/or the volatile memory circuit 206 and gain access to the PUF's 210 initial logical state values. Resetting the IC 200 would terminate the insecure application 204 running and cause the secure boot flow to start again.

According to one aspect, the specific volatile memory circuit cells that make up the PUF 210 may be selected in various ways. According to one example, the PUF 210 memory cells may be a contiguous block of memory circuit cells chosen for reliability (i.e., increased likelihood of producing consistent logical state values upon power ON). According to another example, the PUF 210 memory cells may be non-contiguous to one another, and even chosen at random from various sites of the volatile memory circuit 206. However, once the specific volatile memory circuit cells that make up the PUF 210 are chosen, the same specific volatile memory circuit cells are again chosen every time at power ON to be the basis of the PUF 210.

Although the volatile memory circuit 206 and the secure volatile memory circuit 212 are shown as independent circuit blocks in FIG. 2, they may, according to one aspect, be a part of one physical volatile memory circuit. For example, the secure volatile memory circuit 212 may be a portion of the volatile memory circuit 206 that is apportioned and secured by the SEE 208. According to another aspect, however, the two memory circuits 206, 212 may be different memory circuits both located on the same IC 200.

Figure 3:
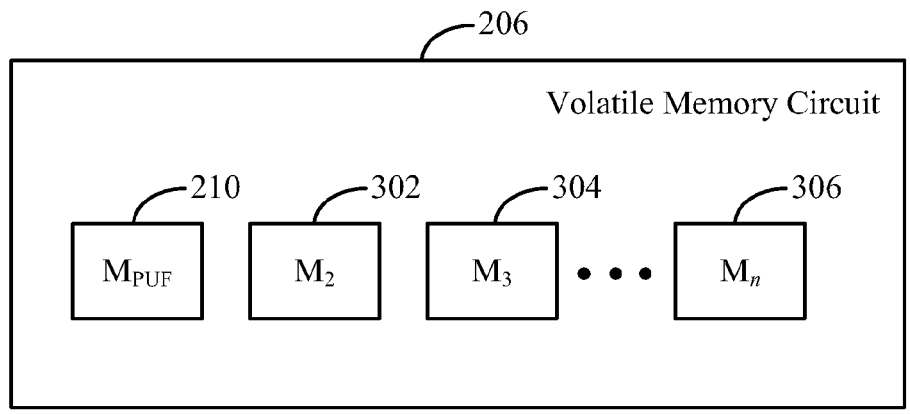
FIG. 3 illustrates a schematic block diagram of the volatile memory circuit.

FIG. 3 illustrates a schematic block diagram of the volatile memory circuit 206 according to one aspect of the disclosure. The volatile memory circuit 206 may include a plurality of memory modules/circuits 210, 302, 304, 306 each comprising a plurality of volatile memory circuit cells. According to one example, the volatile memory modules/circuits 206, 302, 304, 306 are SRAM modules/circuits each comprising a plurality of SRAM circuit cells. The volatile memory circuit 206 includes the PUF memory circuit 210 (herein also referred to as "first volatile memory circuit"). All of the memory circuits 210, 302, 304, 306 may be used to store general data and code (e.g., storing code related to user applications, secondary boot loader code, and/or HLOS). However, according to one aspect the initial logical state values of the PUF memory circuit 210 should first be cleared before that memory circuit 210 is used for general data storage. As will be explained in greater detail below with respect to FIGS. 6 and 7, the initial logical state values of the PUF memory circuit 210 and/or secret data derived from such initial logical state values may first be stored in a second volatile memory circuit 302 (herein may also be referred to as "reserved volatile memory circuit") before the PUF memory circuit 210 is cleared.

Figure 4:
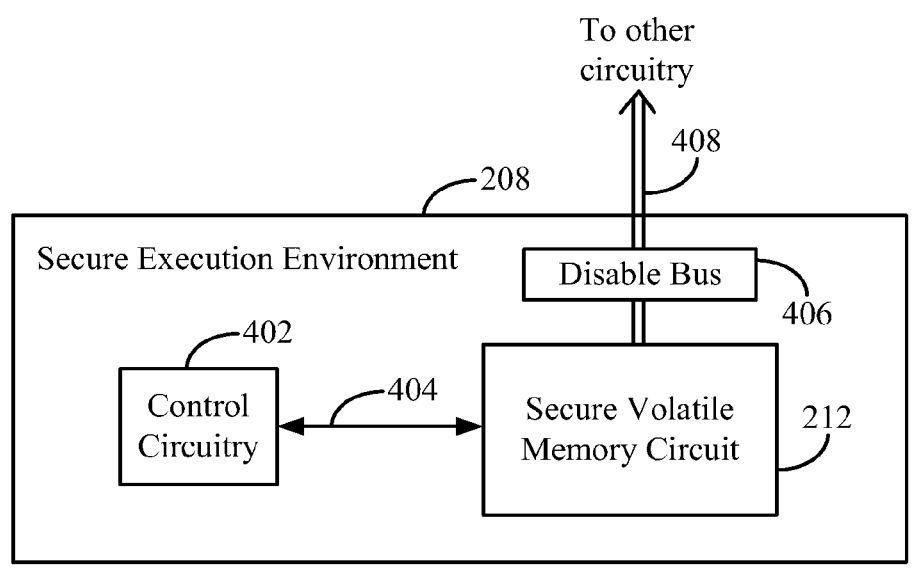
FIG. 4 illustrates a schematic block diagram of the secure execution environment.

FIG. 4 illustrates a schematic block diagram of the SEE 208 according to one aspect of the disclosure. The SEE 208 may include the secure volatile memory circuit 212, control circuitry 402, and a secure bus line 404 that allows for communication between components of the SEE 208, such as the secure volatile memory circuit 212 and the control circuitry 402. The control circuitry 402 is control logic that can only be accessed and utilized by the SEE 208, rather than insecure applications such as user applications, the HLOS, and/or some secondary boot loaders. The control circuitry 402 may control how data is stored and copied to and read from the secure volatile memory circuit 212. The control circuitry 402 may also execute the cryptographic algorithms discussed herein that extract the secret key based on the secret data derived from the initial logical state values of the PUF 210 (see FIG. 2), and in some cases additional auxiliary data. The control circuitry 402 may further generate additional secondary keys and/or public data based on the secret key. Thus, the SEE control circuitry 402 represents one example of a means for executing the cryptographic algorithm at the SEE to extract the secret key based on the secret data.

The secure volatile memory circuit 212 includes one or more secure volatile memory circuits each comprising a plurality of memory cells. The secure volatile memory circuit 212 may be any type volatile memory, such as but not limited to eDRAM, SRAM, etc. The secure volatile memory circuit 212 stores the secret data and also the secret key extracted by the control logic 402 based, in part, on the secret data. The SEE 208 exercises complete control over the secure volatile memory circuit 212 such that other applications (e.g., insecure applications) cannot access the secure volatile memory circuit 212. For example, the SEE 208 may physically lock down (shown as disable bus logic 406) any bus 408 lines that couple the secure volatile memory circuit 212 to other, insecure circuitry of the IC 200.

Figure 5:
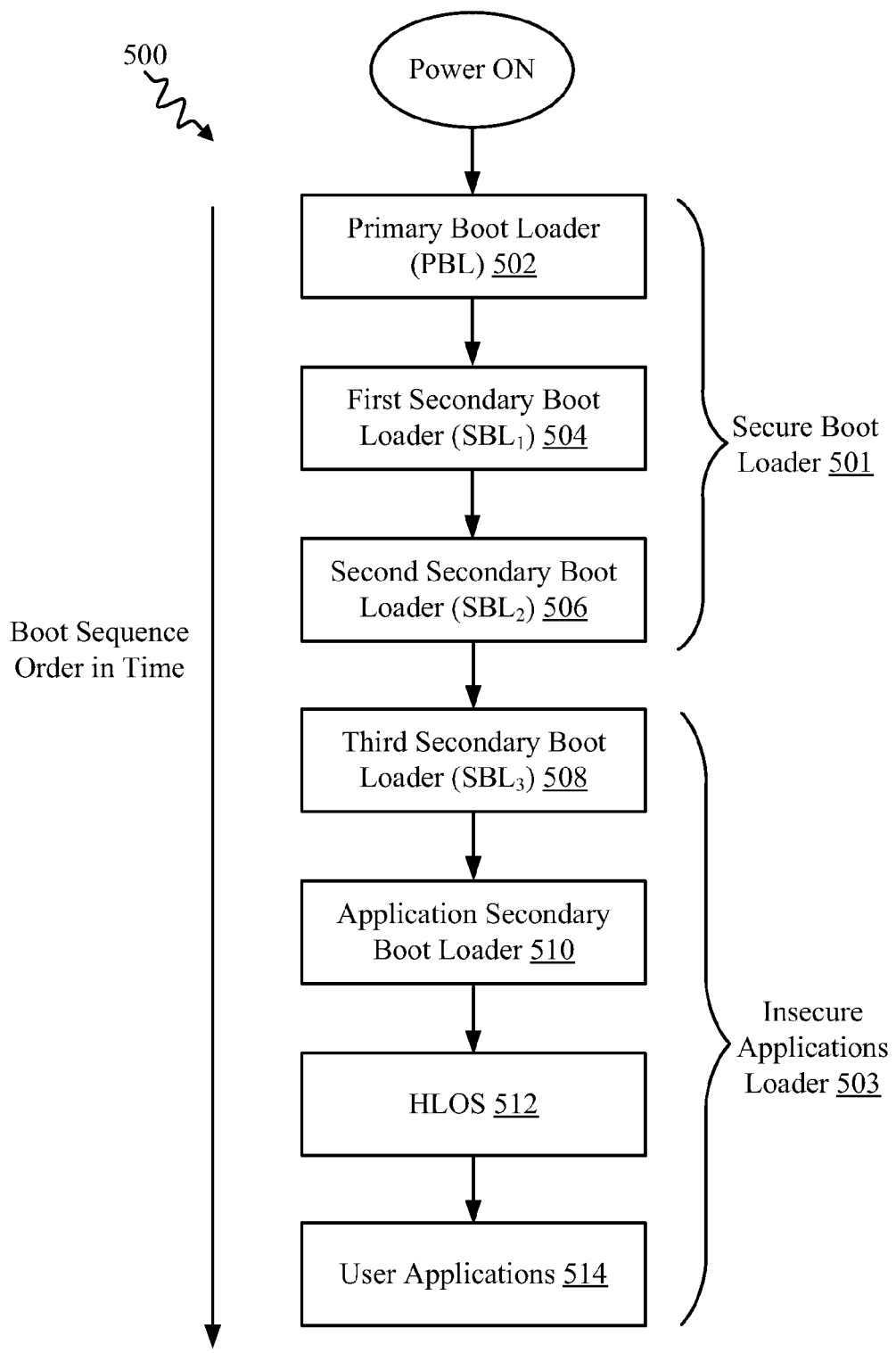
FIG. 5 illustrates a secure boot flow hierarchy.

FIG. 5 illustrates a secure boot flow 500 hierarchy according to one aspect of the disclosure. The secure boot flow 500, which may be executed by the IC 200 (e.g., its processing circuit 203) may be comprised in part by the secure boot loader 501 and in part by the insecure applications loader 503. The secure boot loader 501 may include a primary boot loader (PBL) 502, a first secondary boot loader ($SBL_1$) 504, and a second secondary boot loader ($SBL_2$) 506. The code executed by the secure boot loader 501 is considered "secure" in that no unauthorized user code (e.g., HLOS, user applications, etc.) may be executed and/or injected during this portion of the boot up process. Thus, there is little risk that information related to the initial logical state values of the PUF 210 (see FIG. 2), the secret data derived from such initial logical state values, and/or the secret key extracted based on the secret data will be compromised/leaked to unauthorized applications during this portion of the secure boot flow 500.

The insecure applications loader 503 may include a third secondary boot loader ($SBL_3$) 508, an application secondary boot loader 510, the HLOS 512, and user applications 514. The insecure applications loader 503 is considered "insecure" in that unauthorized user code may be executed and/or injected during execution and/or authentication of one or more of these loaders 508, 510, 512, 514.

Referring to FIGS. 2 and 5, upon power ON of the IC 200, the secure boot flow 500 commences with the execution of the primary boot loader 502 that performs some of the most initial and basic tasks of the IC 200, including initialization of various circuits and modules of the IC 200. The PBL 502 may be hard-wired (e.g., stored in ROM) and is thus very secure because it cannot practically be altered. The PBL 502 also loads and authenticates the $SBL_1$ 504 before the $SBL_1$ 504 executes. After authentication of the $SBL_1$ 504, the $SBL_1$ 504 executes and may, among other things, derive secret data based on the volatile memory circuit's 206 initial logical state values and store the secret data to other memory circuits within the IC 200. The $SBL_1$ 504 may also: initialize the RPM circuit 201; configure the IC 200 system clock and release reset; and load and authenticate the $SBL_2$ 506 before the $SBL_2$ 506 executes.

After the $SBL_2$ 506 is authenticated, the $SBL_2$ 506 executes and may, among other things, copy the secret data from an insecure memory circuit to the secure volatile memory circuit 212. The $SBL_2$ 506 may also: initialize one or more processing circuits (e.g., processing circuit 203) of the IC 200; configure memory circuits external to the IC 200 (e.g., external DRAM and/or SRAM); and load and authenticate the SEE 208, other firmware, and/or the $SBL_3$ 508. After authentication of the $SBL_3$ 508, the $SBL_3$ 508 executes and may, among other things, check storage mode for software flashing. The $SBL_3$ 508 may also load and authenticate the HLOS 512 and/or the application secondary boot loader 510. In a similar fashion, subsequent boot up processes are loaded, authenticated, and executed in successive order, such as the application secondary boot loader 510, the HLOS 512, and user applications 514. The order in which these processes 502, 504, 506, 508, 510, 512 are loaded and executed may vary from that shown in FIG. 5. Moreover, the number and type of secondary boot loaders and other application code shown in FIG. 5 is merely illustrative/exemplary. For example, in other aspects of the disclosure more or less secondary boot loaders may comprise the secure boot flow 500.

Figure 6:
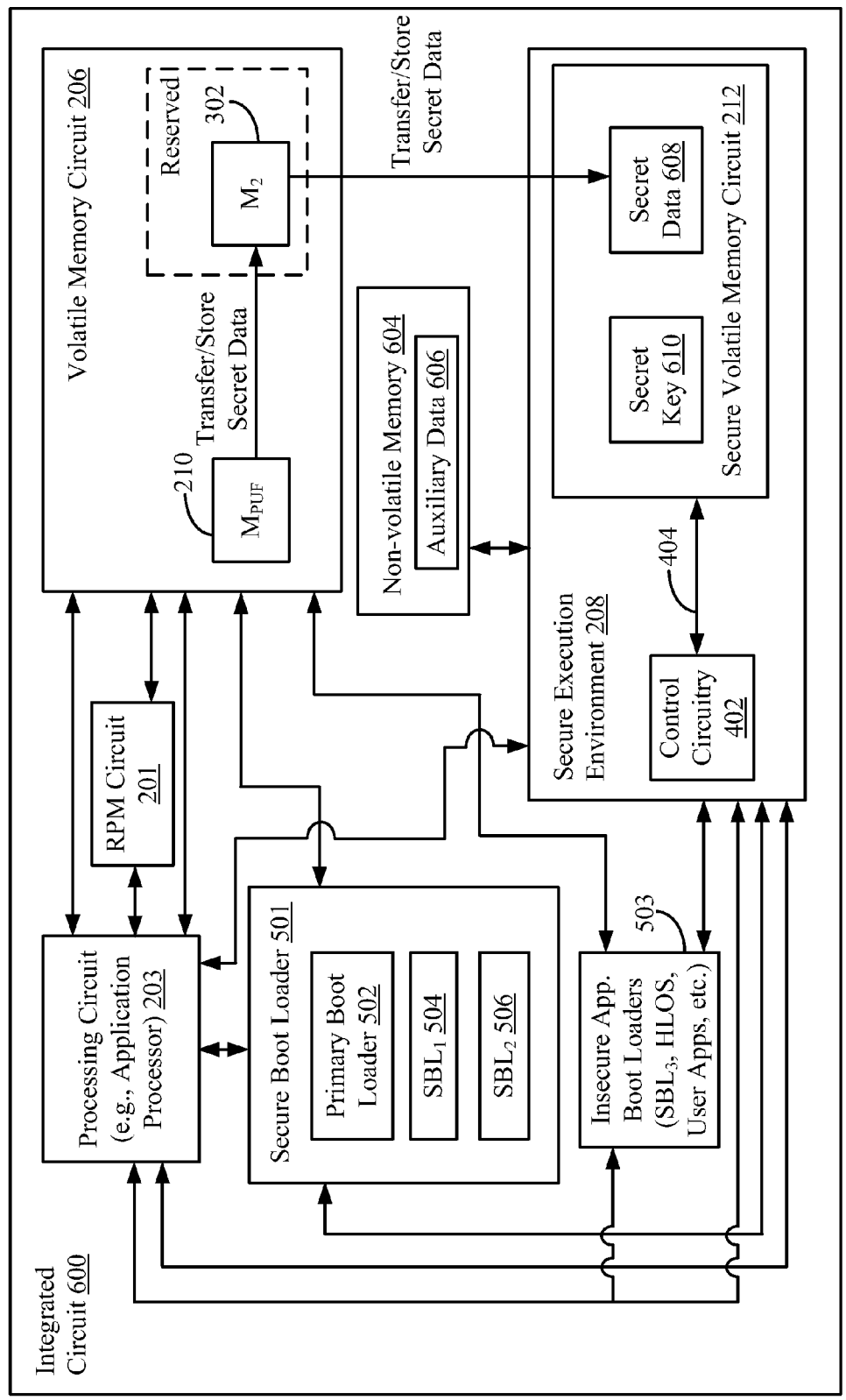
FIG. 6 illustrates an IC featuring the secure boot flow that extracts and stores a secret key.

FIG. 6 illustrates an IC 600 featuring the secure boot flow described herein that extracts and stores a secret key according to one aspect of the disclosure. The IC 600 may comprise the RPM circuit 201, the processing circuit (e.g., application processor) 203, the secure boot loader 501, the insecure application boot loader 503, the volatile memory circuit 206, the SEE 208, and/or non-volatile memory circuitry 604. The secure boot loader 501 may include the PBL 502, the $SBL_1$ 504, and/or the $SBL_2$. The insecure application boot loader 503 may include boot loaders for the portion of the secure boot flow 500 that executes after the $SBL_2$ 506 (see FIG. 5). For example, the insecure application boot loader 503 may include the $SBL_3$ 508, the application secondary boot loader 510, the HLOS code 512, and/or user applications 514. The volatile memory circuit 206 includes the first volatile memory circuit 210 (i.e., the PUF) and the second/reserved volatile memory circuit 302. The SEE 208 includes the SEE control circuitry 402 and the secure volatile memory circuit 212. The secure volatile memory circuit 212 includes a first secure volatile memory circuit 608 that is configured to store the secret data derived from the PUF's initial logical state values and a second secure volatile memory circuit 610 configured to store the secret key.

The non-volatile memory circuit 604 includes auxiliary data 606. According to one example, the non-volatile memory circuit 604 is part of the IC 600 (i.e., it is "on-chip"). According to another example, the non-volatile memory circuit 604 is not part of the IC 600 and is a separate circuit that is in communication with the IC 600 (i.e., it is "off-chip"). Some or all of the auxiliary data 606 may be insecure in that it can be accessed by insecure applications. The first secure volatile memory circuit 608 represents one example of a means for storing the secret data in a secure volatile memory circuit, and the second secure volatile memory circuit 610 represents one example of a means for storing the secret key in a secure volatile memory circuit.

Figure 7A:
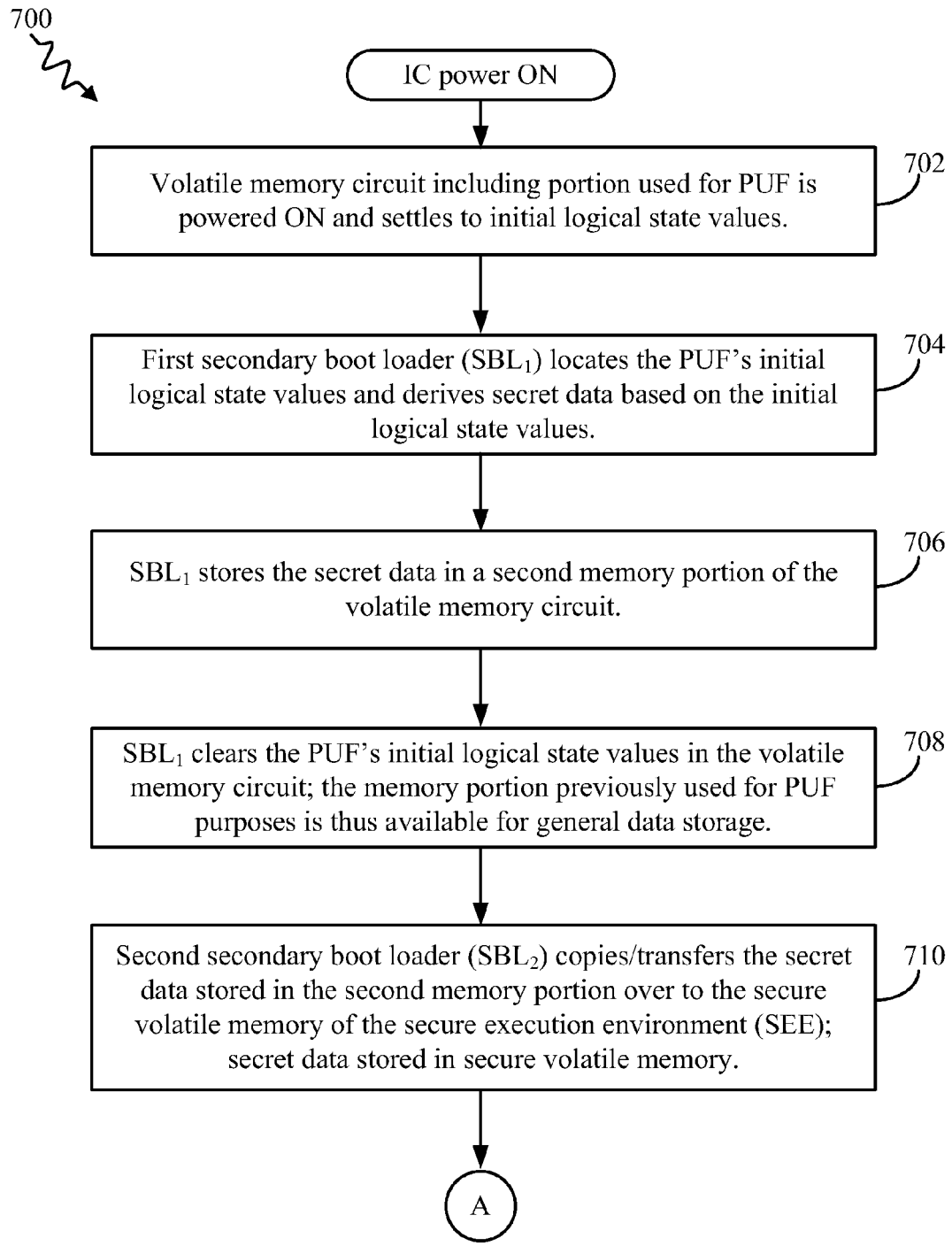
FIGS. 7A and 7B, illustrates a flow chart that depicts a secure boot flow that causes the integrated circuit to extract and store a secret key.
Figure 7B:
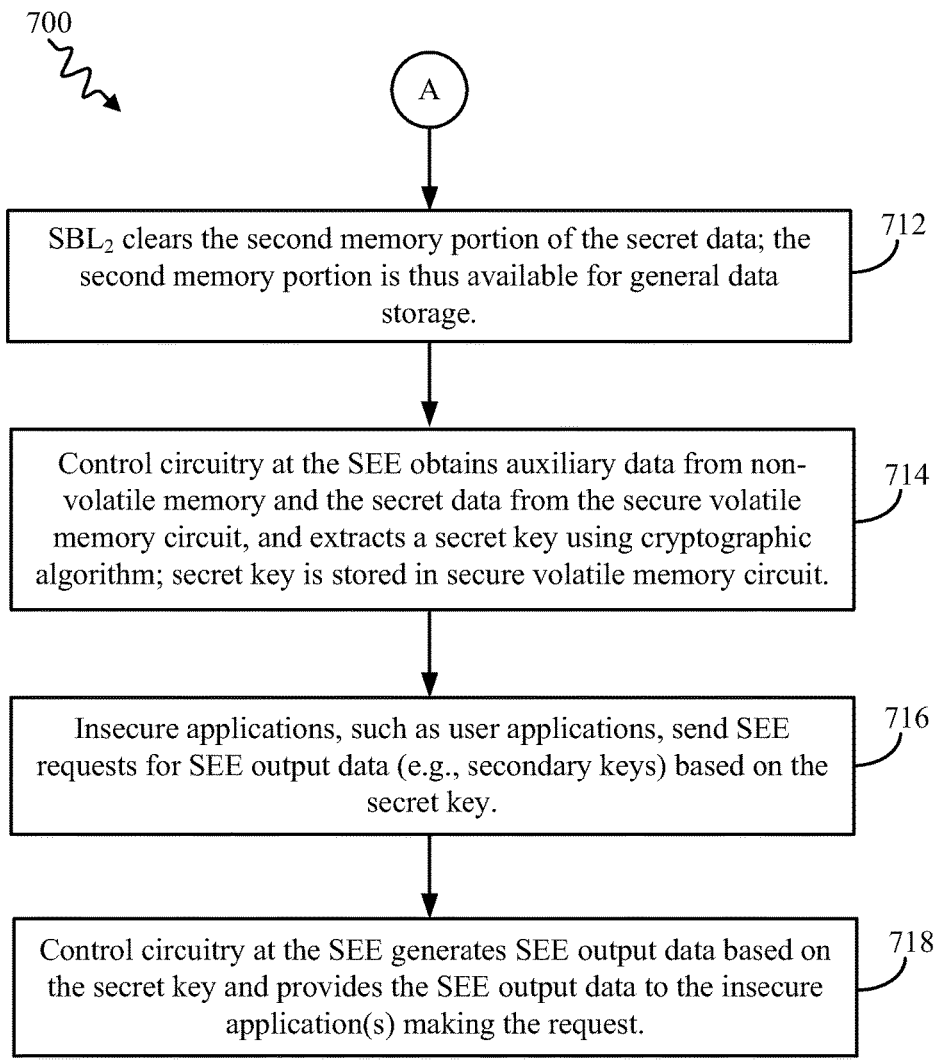

FIG. 7, comprising FIGS. 7A and 7B, illustrates a flow chart 700 that depicts a secure boot flow that causes the integrated circuit 600 to extract and store a secret key according to one aspect. Referring to FIGS. 6 and 7, upon power ON of the IC 600, power is supplied to the volatile memory circuit 206, including the first volatile memory circuit 210 (i.e., portion of memory used for PUF). As described above with respect to FIG. 2, the volatile memory circuit 206 is of a type of volatile memory, such as SRAM, whose memory circuit cells will typically each initially settle to a preferred logical state at power ON due to manufacturing details unique to each cell. The initial logical values are substantially repeatable such that at start-up (i.e., power ON) a large majority of the cells will settle to the same value each time. Thus, at power ON the volatile memory circuit 206 including the first volatile memory circuit 210 used for the PUF settles to initial logical state values 702.

Next, the first secondary boot loader (SBL$_1$) 504 locates the memory circuit cells of the volatile memory circuit 206 whose initial logical state values will be used (i.e., the portion of memory designated the first volatile memory circuit 210), and derives secret data based on those initial logical state values 704. As described above, the secret data may be equal to the initial logical state values, or the secret data may be derived based on some function of the initial logical state values. After the secret data is derived, the SBL$_1$ 504 stores the secret data in the second (i.e., reserved) memory portion 302 of the volatile memory circuit 706. Then, the SBL$_1$ 504 clears the first volatile memory circuit's 210 initial logical state values so that no trace of the initial logical state values can be found at those memory address locations by subsequent processes/applications (e.g., insecure applications). Once cleared, the first volatile memory circuit 210 is available for general data storage (i.e., any subsequent process/application may use that first volatile memory circuit 210) 708.

Next, the second secondary boot loader (SBL$_2$) 506 copies/transfers the secret data stored in the second memory portion 302 over to the secure volatile memory circuit 212 of the SEE 208. For example, the secure data may be stored at the first secure volatile memory circuit 608. The SBL$_2$ 506 then clears the second memory portion 302 of the volatile memory circuit 206 and/or clears the entire volatile memory circuit 206 in order to eliminate any trace of the secret data in the volatile memory circuit 206. Once cleared, the reserved memory portion 302 is available for general data storage (i.e., any subsequent process/application may use that reserved memory portion 302) 712.

Further, the SEE 208 then extracts a secret key based on the secret data. For example, the control logic circuitry 402 at the SEE 208 obtains the secret data stored at the first secure volatile memory circuit 608 and auxiliary data 606 stored at the non-volatile memory circuit 604. After obtaining this data, the control circuitry 402 executes a cryptographic algorithm (e.g., at least one of a block code algorithm, a spreading code algorithm, a repeat code algorithm, etc.) using the auxiliary data 606 and secret data as inputs to extract the secret key. The cryptographic algorithm may include error correction techniques to extract the same secret key despite some differences between the secret data and/or initial logical state values from one boot to the next. The secret key is also stored in secure volatile memory 212 (e.g., the second secure volatile memory circuit 610) 714.

Since the secret key is stored securely within the SEE's 208 control at the secure volatile memory circuit 212, the secret key cannot be accessed by other insecure applications. Such insecure applications may send requests to the SEE 208 for SEE output data (e.g., as described above includes cryptographic data and/or public data) based on the secret key 716. The control logic circuitry 402 at the SEE 208 may then generate the SEE output data based on the secret key and provide the SEE output data to the requesting insecure application 718.

Since the secret key is only stored in the secure volatile memory 212, the secret key is lost when the IC 600 is powered OFF. It must again be re-extracted upon power ON through the secure boot flow 700 based on the PUF's 210 initial logical state values as described above. A nefarious party attempting to gain unauthorized access to the secret key by physically opening up the IC 600 and inspecting memory circuits would be unable to obtain the key since it is not stored in non-volatile memory.

According to one aspect, the IC 600 and/or the volatile memory circuit 206 is designed such that upon reset the secure boot flow 700 is immediately executed (e.g., the IC 600 is also reset). According to one aspect, the RPM circuit 201 may be in sole control of resetting the volatile memory circuit 206. As such an insecure application cannot reset the PUF 210 and/or the volatile memory circuit 206 and gain access to the PUF's 210 initial logical state values. Resetting the IC 600 would terminate the insecure application running and cause the secure boot flow 700 to again commence.

According to one aspect, the specific volatile memory circuit cells that make up the PUF 210 may be selected in various ways. According to one example, the PUF 210 memory cells may be a contiguous block of memory circuit cells chosen for reliability (i.e., increased likelihood of producing consistent logical state values upon power ON). According to another example, the PUF 210 memory cells may be non-contiguous to one another, and even chosen at random from various sites of the volatile memory circuit 206. However, once the specific volatile memory circuit cells that make up the PUF 210 are chosen, the same specific volatile memory circuit cells are again chosen every time at power ON to be the basis of the PUF 210.

Figure 8:
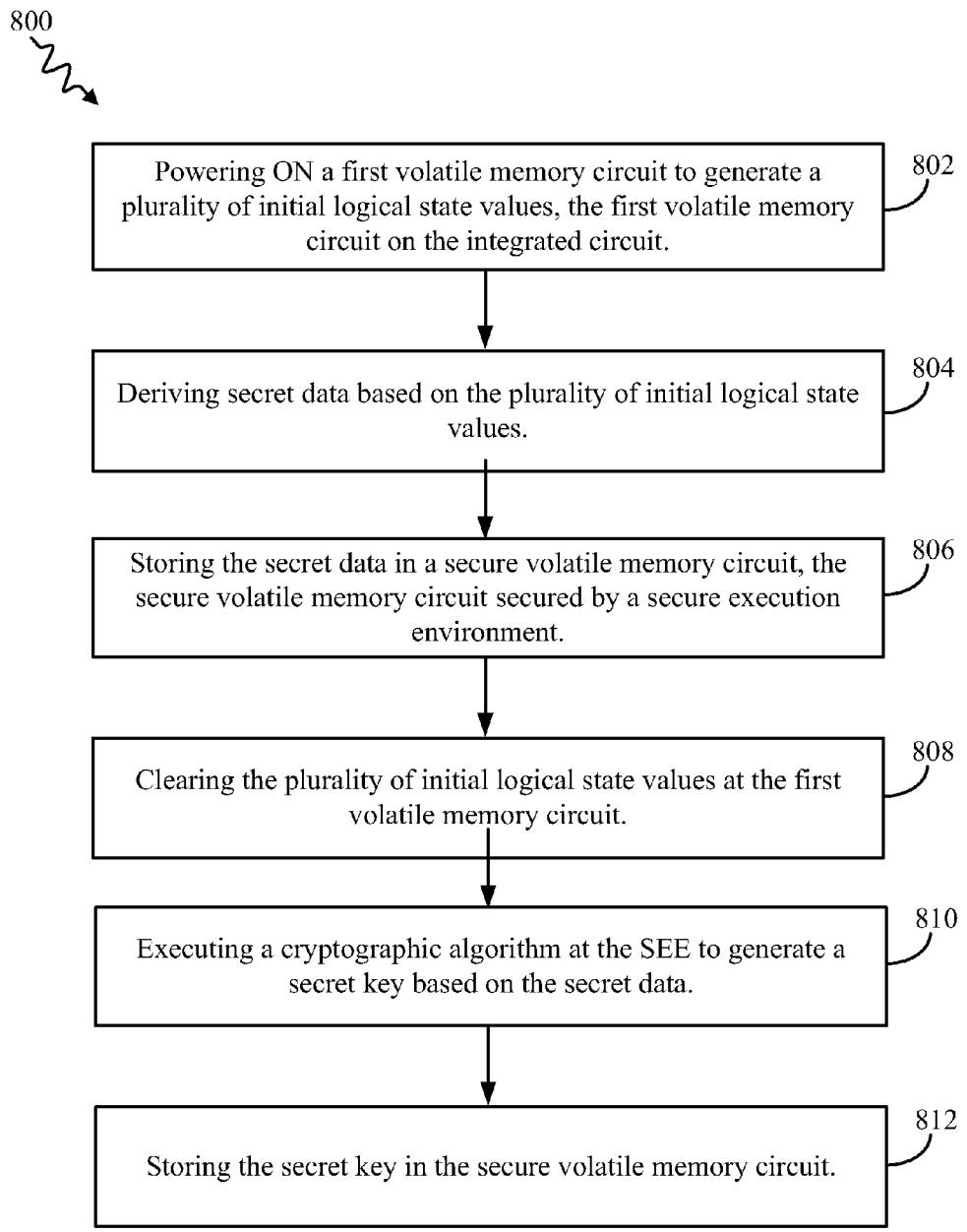
FIG. 8 illustrates a method operational at an integrated circuit.

FIG. 8 illustrates a method 800 operational at an integrated circuit according to one aspect of the disclosure. First, a first volatile memory circuit is powered ON to generate a plurality of initial logical state values, where the first volatile memory circuit is on the integrated circuit 802. Next, secret data is derived based on the plurality of initial logical state values 804. Then, the secret data is stored in a secure volatile memory circuit, where the secure volatile memory circuit is secured by a secure execution environment (SEE) 806. Next, the plurality of initial logical state values are cleared in the first volatile memory circuit 808. Then, a cryptographic algorithm is executed at the SEE to extract a secret key based on the secret data 810. The secret key is also stored in the secure volatile memory circuit 812. According to one aspect, the secret key may be extracted and stored (i.e., steps 810, 812) before the plurality of initial logical state values are cleared in the first volatile memory circuit (step 808).

Figure 9:
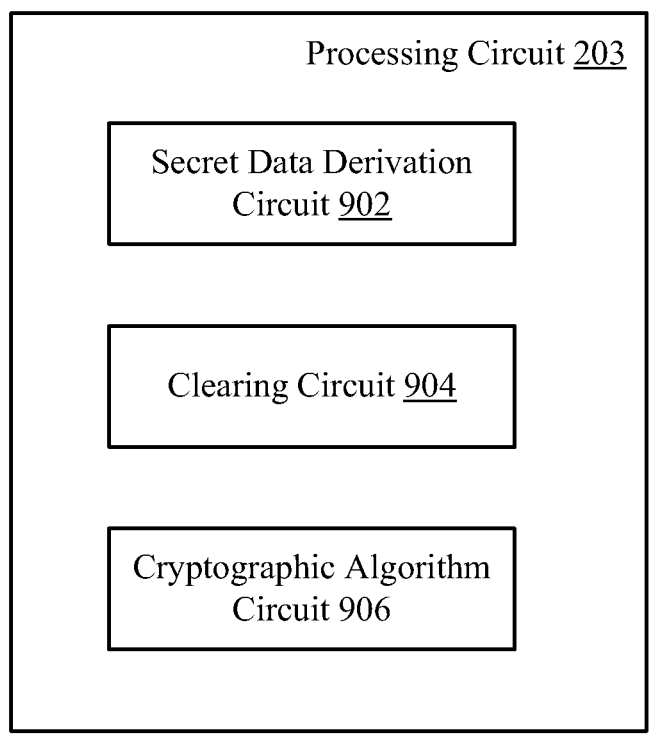
FIG. 9 illustrates a schematic block diagram of the processing circuit of the ICs described herein.

FIG. 9 illustrates a schematic block diagram of the processing circuit 203 of the ICs 200, 600 according to one aspect of the disclosure. The processing circuit 203 may include a secret data derivation circuit 902, a clearing circuit 904, and/or a cryptographic algorithm circuit 906.

Referring to FIGS. 2, 6, 8, and 9, the secret data derivation circuit 902 is one example of a means for deriving secret data based on the plurality of initial logical state values. The clearing circuit 904 is one example of a means for clearing the plurality of initial logical state values in the first volatile memory circuit 206. The cryptographic algorithm circuit 906 is one example of a means for executing a cryptographic algorithm at the SEE 208 to extract a secret key based on the secret data.

One or more of the components, steps, features, and/or functions illustrated in FIGS. 2, 3, 4, 5, 6, 7A, 7B, 8, and 9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 3, 4, 6, and/or 9 may be configured to perform one or more of the methods, features, or steps described in FIGS. 5, 7A, 7B, and/or 8. The algorithms described herein may also be efficiently implemented in software and/or embedded in hardware.

Moreover, in one aspect of the disclosure, the processing circuit 203 illustrated in FIGS. 2, 6, and/or 9 may be a specialized processor (e.g., an application specific integrated circuit (e.g., ASIC)) that is specifically designed and/or hard-wired to perform the algorithms, methods, and/or steps described in FIGS. 5, 7A, 7B, and/or 8. Thus, such a specialized processor (e.g., ASIC) may be one example of a means for executing the algorithms, methods, and/or steps described in FIGS. 5, 7A, 7B, and/or 8.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for operating a secure boot flow that controls access to a first volatile memory circuit of an integrated circuit to secure secret data from one or more insecure applications, the method comprising:

initializing a resource power management circuit coupled to a first volatile memory circuit;

powering ON the first volatile memory circuit to generate a plurality of initial logical state values, wherein the first volatile memory circuit is powered ON by the resource power management circuit and wherein the first volatile memory circuit is an insecure volatile memory circuit on the integrated circuit;

deriving the secret data, wherein the secret data includes the plurality of initial logical state values;

storing the secret data in a secure volatile memory circuit, the secure volatile memory circuit secured by a secure execution environment (SEE);

clearing the plurality of initial logical state values in the first volatile memory circuit so that the first volatile memory circuit no longer stores one or more of the plurality of initial logical state values;

executing an algorithm at the SEE to extract a secret key based on the secret data; and storing the secret key in the secure volatile memory circuit, wherein the first volatile memory circuit is configured to be reset exclusively by the resource power management circuit to prevent the one or more insecure applications from resetting the first volatile memory circuit and obtaining the plurality of initial logical state values, and wherein the resetting of the first volatile memory circuit causes execution of the secure boot flow of the integrated circuit, where the secure boot flow includes a primary boot loader, a first secondary boot loader, and a second secondary boot loader, and the secure boot flow establishes a chain of trust.

2. The method of claim 1, wherein the secure boot flow secures the secret data and the plurality of initial logical state values from the one or more insecure applications by rendering the first volatile memory circuit inaccessible to the one or more insecure applications until at least after the plurality of initial logical state values have been cleared in the first volatile memory circuit.

3. The method of claim 2, wherein the secure boot flow establishes the chain of trust by having the primary boot loader authenticate the first secondary boot loader before the first secondary boot loader executes, the first secondary boot loader authenticate the second secondary boot loader before the second secondary boot loader executes, and the second secondary boot loader authenticate the SEE, and wherein the secret key is extracted and stored in the secure volatile memory circuit during the secure boot flow and prior to execution of the one or more insecure applications.

4. The method of claim 1, wherein after clearing the first volatile memory circuit, the first volatile memory circuit is available for data storage for one or more insecure applications.

5. The method of claim 1, wherein the SEE prevents insecure applications from accessing the secure volatile memory circuit.

6. The method of claim 1, wherein the plurality of initial logical state values are substantially the same every time the first volatile memory circuit is powered ON.

7. The method of claim 1, wherein the algorithm is based on at least one of a block code algorithm, a spreading code algorithm, and/or a repeat code algorithm.

8. The method of claim 1, further comprising:

storing the secret data in a second volatile memory circuit prior to storing the secret data in the secure volatile memory circuit; and clearing the secret data stored in the second volatile memory circuit after storing the secret data in the secure volatile memory circuit.

9. The method of claim 8, wherein after clearing the secret data stored in the second volatile memory circuit, the second volatile memory circuit is available for data storage for one or more insecure applications.

10. The method of claim 1, wherein the SEE controls access to the secret key by making it inaccessible to an insecure application, and the method further comprises:

receiving a request from the insecure application at the SEE for at least one of a secondary key and/or public data;

generating the secondary key and/or the public data at the SEE based on the secret key; and providing the secondary key and/or the public data to the insecure application requesting the secondary key and/or the public data.

11. The method of claim 10, wherein the secondary key and/or the public data is generated based on the secret key and other data provided by the insecure application.

12. The method of claim 1, wherein the algorithm executed at the SEE to extract the secret key based on the secret data is further based on auxiliary data stored in a non-volatile memory circuit.

13. An integrated circuit comprising:

a first volatile memory circuit configured to generate a plurality of initial logical state values upon power ON, wherein the first volatile memory circuit is an insecure volatile memory circuit;

a secure volatile memory circuit secured by a secure execution environment (SEE); and a processing circuit configured to execute a secure boot flow that controls access to the first volatile memory circuit to secure secret data from one or more insecure applications, the processing circuit communicatively coupled to the first volatile memory circuit and the secure volatile memory circuit, the processing circuit further configured to initialize a resource power management circuit coupled to the first volatile memory circuit, the resource power management circuit configured to power ON the first volatile memory circuit, derive the secret data, wherein the secret data includes the plurality of initial logical state values, store the secret data in the secure volatile memory circuit, clear the plurality of initial logical state values in the first volatile memory circuit so that the first volatile memory circuit no longer stores one or more of the plurality of initial logical state values, execute an algorithm at the SEE to extract a secret key based on the secret data, and store the secret key in the secure volatile memory circuit, wherein the first volatile memory circuit is configured to be reset exclusively by the resource power management circuit to prevent the one or more insecure applications from resetting the first volatile memory circuit and obtaining the plurality of initial logical state values, and wherein the resetting of the first volatile memory circuit causes the processing circuit to execute the secure boot flow of the integrated circuit, where the secure boot flow includes a primary boot loader, a first secondary boot loader, and a second secondary boot loader, and the secure boot flow establishes a chain of trust.

14. The integrated circuit of claim 13, wherein the processing circuit executes the secure boot flow by (i) deriving the secret data, (ii) storing the secret data, (iii) clearing the plurality of initial logical state values, (iv) executing the algorithm, and (v) storing the secret key.

15. The integrated circuit of claim 14, wherein the secure boot flow secures the secret data and the plurality of initial logical state values from the one or more insecure applications by rendering the first volatile memory circuit inaccessible to the one or more insecure applications until at least after the plurality of initial logical state values have been cleared in the first volatile memory circuit.

16. The integrated circuit of claim 15, wherein the secure boot flow establishes a chain of trust by having the primary boot loader authenticate the first secondary boot loader before the first secondary boot loader executes, the first secondary boot loader authenticate the second secondary boot loader before the second secondary boot loader executes, and the second secondary boot loader authenticate the SEE, and wherein the secret key is extracted and stored in the secure volatile memory circuit during the secure boot flow and prior to execution of the one or more insecure applications.

17. The integrated circuit of claim 13, wherein after clearing the first volatile memory circuit, the first volatile memory circuit is available for data storage for one or more insecure applications.

18. The integrated circuit of claim 13, wherein the processing circuit is further configured to:
store the secret data in a second volatile memory circuit prior to storing the secret data in the secure volatile memory circuit; and
clear the secret data stored in the second volatile memory circuit after storing the secret data in the secure volatile memory circuit.

19. The integrated circuit of claim 13, wherein the SEE controls access to the secret key by making it inaccessible to an insecure application, and wherein the processing circuit is further configured to:
receive a request from the insecure application at the SEE for at least one of a secondary key and/or public data;
generate the secondary key and/or the public data at the SEE based on the secret key; and
provide the secondary key and/or the public data to the insecure application requesting the secondary key and/or the public data.

20. The integrated circuit of claim 13, wherein the algorithm executed at the SEE to extract the secret key based on the secret data is further based on auxiliary data stored in a non-volatile memory circuit.

21. An integrated circuit comprising:
means for initializing a resource power management circuit coupled to a first volatile memory circuit, wherein the resource power management circuit is configured to power ON the first volatile memory circuit to generate a plurality of initial logical state values, wherein the first volatile memory circuit is an insecure volatile memory circuit on the integrated circuit;
means for deriving secret data, wherein the secret data includes the plurality of initial logical state values;
means for storing the secret data in a secure volatile memory circuit, the secure volatile memory circuit secured by a secure execution environment (SEE);
means for clearing the plurality of initial logical state values in the first volatile memory circuit so that the first volatile memory circuit no longer stores one or more of the plurality of initial logical state values;
means for executing an algorithm at the SEE to extract a secret key based on the secret data; and
means for storing the secret key in the secure volatile memory circuit,
wherein the first volatile memory circuit is configured to be reset exclusively by the resource power management circuit to prevent one or more insecure applications from resetting the first volatile memory circuit and obtaining the plurality of initial logical state values, and
wherein the resetting of the first volatile memory circuit causes the integrated circuit to execute a secure boot flow that controls access to the first volatile memory circuit to secure the secret data from the one or more insecure applications, where the secure boot flow includes a primary boot loader, a first secondary boot loader, and a second secondary boot loader, and the secure boot flow establishes a chain of trust.

22. The integrated circuit of claim 21, wherein access to the first volatile memory circuit is controlled to secure the secret data and the plurality of initial logical state values from the one or more insecure applications by rendering the first volatile memory circuit inaccessible to the one or more insecure applications until at least after the plurality of initial logical state values have been cleared in the first volatile memory circuit.

23. A non-transitory computer-readable storage medium having one or more instructions for a secure boot flow of an integrated circuit stored thereon, which when executed by the integrated circuit, causes the integrated circuit to:
initialize a resource power management circuit coupled to a first volatile memory circuit;
power ON the first volatile memory circuit to generate a plurality of initial logical state values, wherein the first volatile memory circuit is powered ON by the resource power management circuit and wherein the first volatile memory circuit is an insecure volatile memory circuit on the integrated circuit;
derive secret data, wherein the secret data includes the plurality of initial logical state values;
store the secret data in a secure volatile memory circuit, the secure volatile memory circuit secured by a secure execution environment (SEE);
clear the plurality of initial logical state values in the first volatile memory circuit so that the first volatile memory circuit no longer stores one or more of the plurality of initial logical state values;
execute an algorithm at the SEE to extract a secret key based on the secret data; and
store the secret key in the secure volatile memory circuit,
wherein the first volatile memory circuit is configured to be reset exclusively by the resource power management circuit to prevent one or more insecure applications from resetting the first volatile memory circuit and obtaining the plurality of initial logical state values, and
wherein the resetting of the first volatile memory circuit causes the integrated circuit to execute the secure boot flow to control access to the first volatile memory circuit to secure the secret data from the one or more insecure applications, where the secure boot flow includes a primary boot loader, a first secondary boot loader, and a second secondary boot loader, and the secure boot flow establishes a chain of trust.

24. The non-transitory computer-readable storage medium of claim 23, wherein access to the first volatile memory circuit is controlled by rendering the first volatile memory circuit inaccessible to the one or more insecure applications until at least after the plurality of initial logical state values have been cleared in the first volatile memory circuit.

\* \* \* \* \*